March 2, 1954  G. A. LYON  2,670,995
WHEEL STRUCTURE
Filed Jan. 29, 1949  3 Sheets-Sheet 1
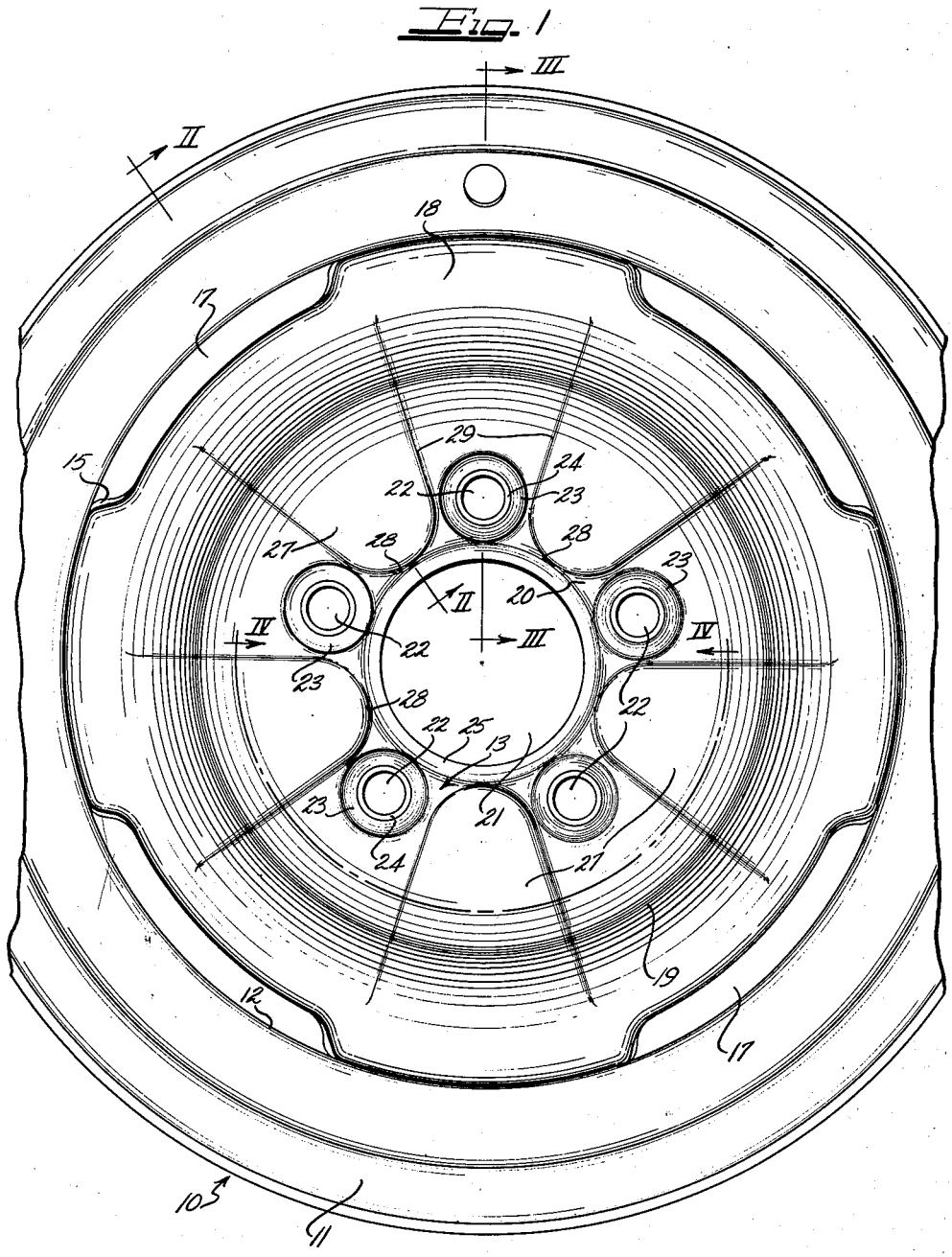
Inventor
GEORGE ALBERT LYON March 2, 1954  G. A. LYON  2,670,995
WHEEL STRUCTURE
Filed Jan. 29, 1949  3 Sheets-Sheet 2
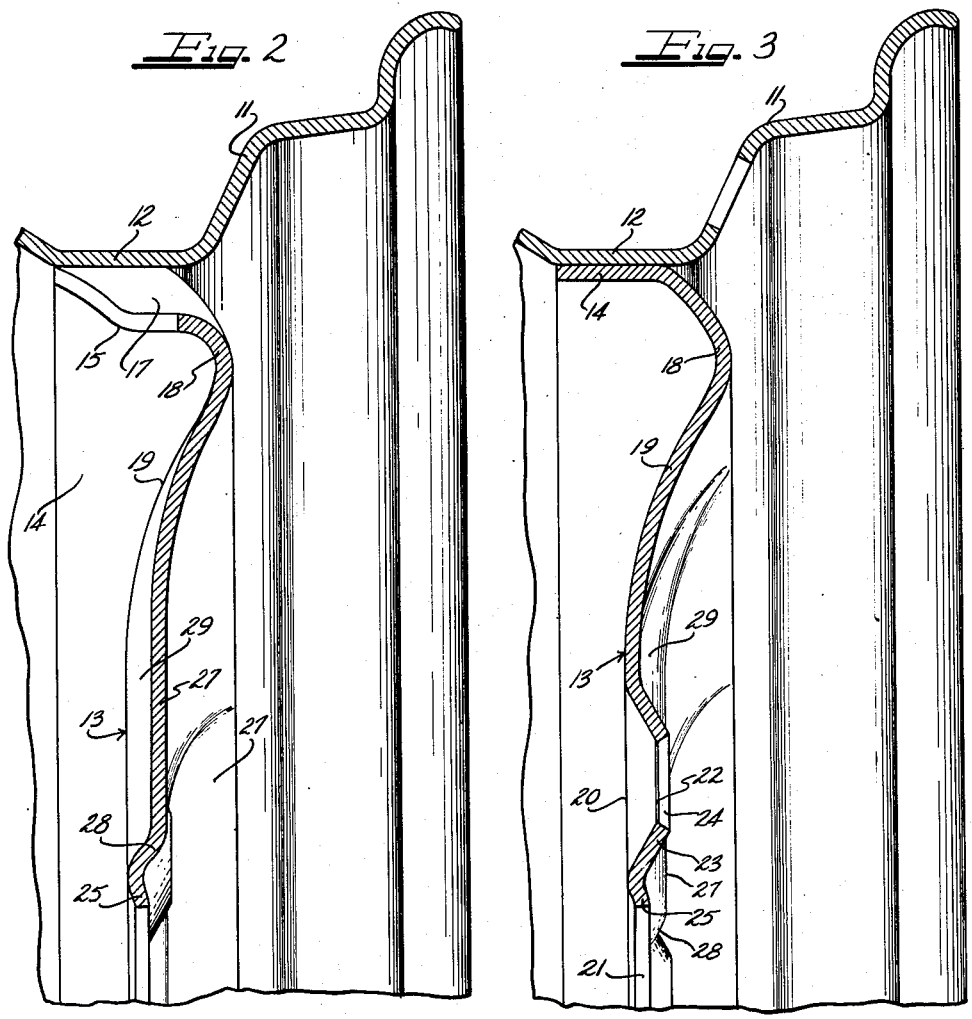
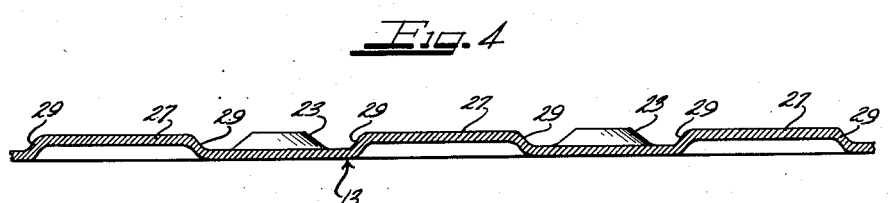
Inventor
GEORGE ALBERT LYON March 2, 1954  G. A. LYON  2,670,995
WHEEL STRUCTURE
Filed Jan. 29, 1949  3 Sheets-Sheet 3

Inventor
GEORGE ALBERT LYON
by Hill, Sherman, Meroni, Gross & Simpson
Attys.

Patented Mar. 2, 1954

2,670,995

UNITED STATES PATENT OFFICE 2,670,995

WHEEL STRUCTURE

George Albert Lyon, Detroit, Mich.

Application January 29, 1949, Serial No. 73,580

1 Claim. (Cl. 301—63)

The present invention relates to improvements in wheel structures, and more particularly to improvements in pressed wheels of the type adapted for use with vehicles such as automobiles.

The principal type of wheel currently used with automobiles, light trucks and similar automotive vehicles is of the pressed steel construction in which both the tire rim and the body portion of the wheel are made from appropriate gauge sheet metal, the tire rim being either a rolled or pressed section and the body being a pressed disk.

Adequate rigidity in the body portion of the wheel has customarily been attained by pressing therein an annular, intermediate axially outwardly protruding nose bulge, whereby to withstand the stresses and strains to which such a wheel is subjected in service. A characteristic of the reinforcing nose bulge is that it protrudes substantially axially outwardly beyond the median plane of the wheel. In wheels of small diameter, in accordance with the recent trend, the reinforcing nose bulge has presented a problem in that it has objectionably crowded the central bolt-on flange of the wheel. Attempts to minimize the dimensions of the nose bulge in order to alleviate this crowding objection have resulted in weakening of the wheel body.

It is accordingly an important object of the present invention to provide an improved vehicle wheel including a pressed sheet metal body and embodying a novel reinforcing structure affording adequate and improved strength and rigidity for the wheel body as well as providing entire freedom of access to the central bolt-on flange area of the wheel body.

Another object of the invention is to provide in the wheel body of a disk-type construction improved reinforcement which encompasses the entire body structure inclusive of the bolt-on flange area thereof.

A further object of the invention is to provide an improved pressed sheet metal wheel body structure having novel radial reinforcement.

According to the general features of the invention there is provided in a wheel structure including a tire rim and a load sustaining body portion, the body portion being formed from pressed sheet metal and including means for attachment to the tire rim and a central bolt-on flange area for attachment of the wheel to an axle part of a vehicle with which the wheel may be used, said bolt-on flange area having a series of spaced bolt-on flange apertures, and a plurality of integral generally radially extending reinforcing embossments extending from between the bolt-on apertures in said bolt-on flange area substantially radially outwardly toward the periphery of the wheel body.

According to other general features of the invention, the bolt apertures are formed with axially outwardly protruding encircling flanges and the reinforcing embossments project from the general plane of the wheel body axially outwardly to approximately the same extent as said bolt aperture flanges.

According to additional general features of the invention there is provided a stamped sheet metal wheel body for use with a vehicle wheel or the like, a body disk having peripheral means for attachment to a tire rim, a central bolt-on flange area, an axially outward annular rounded reinforcing bulge closely adjacent to the peripheral attachment means, and generally radially extending reinforcing embossments running from said annular bulge into said bolt-on area.

Other objects, features and advantages of the present invention will be readily apparent from the following detailed description of certain preferred embodiments thereof taken in conjunction with the accompanying drawings, in which:

Figure 1 is an outer side elevational view of a vehicle wheel embodying the features of the present invention;

Figure 2 is an enlarged radial sectional detail view taken substantially on the line II—II of Figure 1;

Figure 3 is a radial detail sectional view on an enlarged scale taken substantially on the line III—III of Figure 1;

Figure 4 is a sectional view taken substantially on the curved section line IV—IV of Figure 1.

As shown on the drawings:

Figure 5:
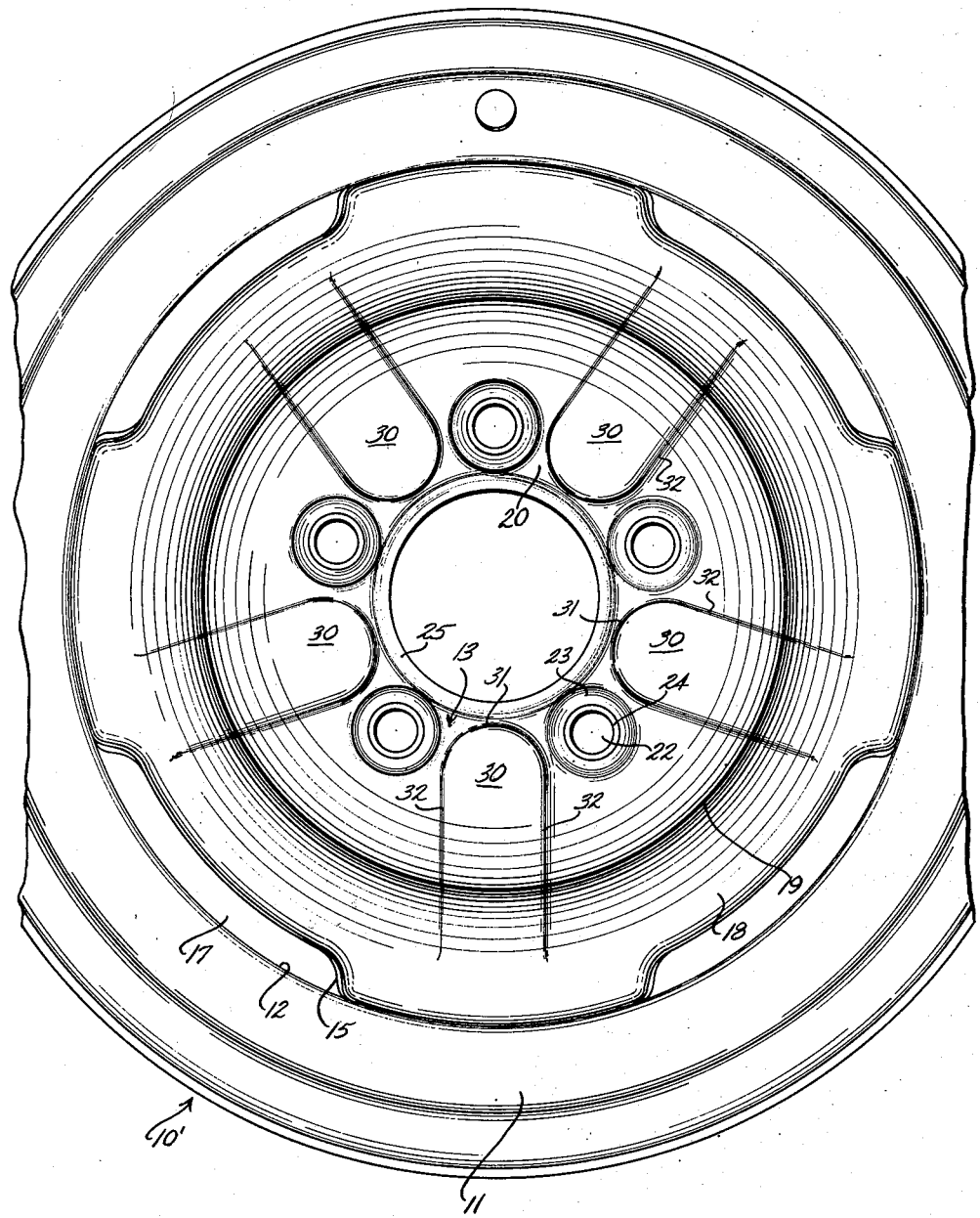
Figure 5 is an outside elevational view of a slightly modified structure of the wheel.

A vehicle wheel 10 embodying the features of the present invention comprise a tire rim 11 of any preferred formation and which, as shown, may be of the multi-flanged drop center type adapted to support a pneumatic tire and tube assembly, not shown (Figures 1, 2 and 3). The tire rim includes a base flange 12.

In load sustaining relation to the tire rim 11 is a wheel body 13 comprising a stamped sheet metal disk of appropriate gauge including means at its periphery in the form of a generally axially inwardly extending flange 14 attached to the inner face of the tire rim base flange 12 in any appropriate manner as by welding or riveting or the like. Attachment of the peripheral flange 14 is limited to a plurality of peripheral areas spaced apart by respective inset flange portions 15 providing ventilation openings 17 between the tire rim and the wheel body.

Closely adjacent to the peripheral attachment flange 14, the wheel body is formed with an axially outwardly protruding annular reinforcing bulge 18 of generally rounded cross-section, merging at its radially inner side on a rather large radius concave contour 19 with the remaining central portion of the wheel body which lies generally close to and preferably parallel with the median plane of the wheel assembly.

The major central area of the wheel body 13 comprises a bolt-on flange 20 about a central axle or hub opening 21. Spaced radially outwardly from the edge defining the central opening 21 is a uniform series of equally spaced bolt holes 22. Each of these holes is defined by an axially outwardly protruding generally frusto-conical reinforcing flange 23. The edge defining each of the bolt holes 22 has an outwardly flaring generally conical formation to provide a seat 24 receptive of the usual conical shoulder provided on the attachment bolts used with wheels of this type.

Defining the perimeter of the central aperture 21 in the wheel and disposed between the edge of the aperture and the reinforcing flanges 23 of the bolt holes, is a reinforcing flange 25 extending generally axially outwardly and radially inwardly from the plane of the bolt-on area 20.

Since the area between the bolt-on flange and the perimeter of the wheel body, and in the present instance the reinforcing bulge area 18 close to the perimeter is in service subjected to a high degree of torsional, radial, and axial stresses, strains and thrusts, strong, highly resistant and efficiently stress and strain absorbing reinforcing and rigidifying structure is provided in the form of generally spoke-like reinforcements 27. In an inexpensive, highly efficient construction, the reinforcements 27 comprise integral embossed areas in the wheel body provided in a symmetrical series radiating from the wheel axis and with one of the reinforcement areas 27 disposed between each adjacent pair of the bolt apertures 22 and more particularly the reinforcing flanges 23 defining such apertures.

Each of the reinforcing embossments 27 projects generally axially outwardly from the wheel body and has a rounded inner terminus 28 closely adjacent to the base of the inner marginal reinforcing flange 25 and generally encompassing the area of the bolt-on flange intermediate the immediately adjacent pair of bolt aperture flanges 23. The rounded nose-like terminus formation of the reinforcing embossment avoids any sharp angles that might provide a locus of fracture. From Figures 1 and 3 it will be observed that the rounded embossment terminus is rounded not only in the direction of the thickness of the embossment but also in the outline of the inner end of the embossment.

From its inner terminus 28, each reinforcing embossment 27 extends generally radially outwardly throughout the wheel body area to the outer marginal reinforcing bulge 18 and by preference merging into the radially inner side of such bulge near the apex of the bulge. Through this arrangement the reinforcing embossments afford strong reinforcement not only for the wheel body throughout the bolt-on flange area thereof and the area between the bolt-on flanges and the reinforcing bulge 18 but also the radially inner side of the reinforcing bulge 18. In the form of Figure 1, the sides of the reinforcing embossments 27 flare or diverge radially outwardly to thus encompass a fairly large proportion of the wheel body area. It will be observed that the sides of the reinforcing embossments 27 provide elongated reinforcing flanges 29, while the embossments taken as individual units provide relatively wide radially extending reinforcing ribs, alternating with the portions of the wheel body having the bolt apertures 22 and forming in a sense inset reinforcing ribs. Thus, substantially all of the body member 13 constitutes a pattern of reinforcements in shallow draw relationships and enabling easy and economical die stamping or drawing of the wheel body.

The radially outer faces of the reinforcing ribs 27 are preferably flat as best seen in Figure 4 and are within the plane of the outermost projecting edges of the bolt aperture reinforcing flanges 23. Hence, completely unobstructed access to the bolt apertures is afforded while nevertheless the entire body of the wheel is fully reinforced. To this end, as best seen in Figure 3, the outer faces of the reinforcing rib bosses 27 extend in a flat plane generally parallel to the median wheel axis plane to a point adjacent to the merging convex area 19 of the wheel body and then merge with the shallow reinforcing bulge 18 on a convex curvature.

In the modification of Figure 5 all details of a wheel 10' there shown are identical with the wheel 10 with the exception of the reinforcing rib bosses identified at 30. Identical reference numerals are applied to the details of the wheel 10' as have been applied to the wheel 10 except where the structure differs in the reinforcing rib bosses 30. As shown, the rib bosses 30 extend from closely adjacent to the inner marginal reinforcing flange 25 of the wheel to merge with the radially inner side of the reinforcing annular bulge 18 of the wheel body. Each of the rib bosses 30 has a rounded radially inner terminus 31. However, the respective opposite sides identified at 32 of each of the rib bosses 30 are substantially parallel and thus provide substantially parallel reinforcing flanges from the rounded nose terminus 31 of each of the rib bosses to merger with the annular reinforcing bulge 18. In other respects the rib bosses 30 are substantially like the rib bosses 27 already described.

From the foregoing, it will be apparent that the present invention provides a novel wheel structure and more particularly a novel wheel body construction in which although the wheel body is quite shallow and disposed close to the median plane of the wheel throughout the major extent of the wheel body, all portions of the wheel body are quite thoroughly reinforced to withstand and absorb the strains and stresses, shocks and thrusts to which such a wheel is subjected in service. By the symmetrical generally radial reinforcing ribs of the body, the body is provided, in effect, with alternating axially outwardly and axially inwardly projecting or offset ribs throughout its major area, inclusive of the bolt-on central flange. Those areas of the wheel body intermediate the axially outward embossments define, in effect, axially inwardly offset or inset alternating ribs. The total effect is a wheel body of great rigidity but low mass and light weight. It is readily apparent that substantial economy in material is afforded by the elimination of the massive reinforcing nose bulge heretofore most generally employed.

I claim as my invention:

In a wheel structure, including a wheel body and a tire rim, the wheel body being generally circular and of pressed sheet metal and having an outer marginal flange for attachment to the tire rim, a shallow axially outwardly projecting narrow marginal annular reinforcing bulge closely adjacent to said attachment flange, the remaining and major portion of the wheel body being dished inwardly from the narrow bulge and curving gradually inwardly approximately to the median plane of the tire rim, and having a central aperture, a reinforcing annular flange defining said central aperture, the central portion of the wheel body lying approximately in the median plane of the tire rim having generally frusto-conical axially outwardly extending flanges defining a series of spaced bolt apertures spaced radially outwardly from, but located close to said central aperture reinforcing flange, and a series of radially extending reinforcing ribs on said dished major body portion having their inner terminals disposed in alternating relation to said bolt aperture flanges and close to said central aperture reinforcing flange, said ribs having their outer terminals merging with the radially inner side of said reinforcing bulge near the apex of the bulge but within the plane of the peak of the bulge, the reinforcing ribs having broad, generally flat axially outer surfaces extending substantially parallel to the median plane of the tire rim and substantially radially and lying substantially in the same plane as the axially outer terminals of the bolt aperture flanges, and the respective sides of the reinforcing rib diverging toward said reinforcing bulge.

GEORGE ALBERT LYON.

References Cited in the file of this patent

UNITED STATES PATENTS

| Number | Name | Date |
|---|---|---|
| 1,483,654 | Eschwig | Feb. 12, 1924 |
| 1,666,611 | Watrous | Apr. 17, 1928 |
| 1,711,628 | Williams | May 7, 1929 |
| 2,187,032 | Horn | Jan. 16, 1940 |
| 2,217,081 | Stough | Oct. 8, 1940 |
| 2,239,898 | Lyon | Apr. 29, 1941 |
| 2,368,254 | Lyon | Jan. 30, 1945 |
| 2,424,106 | Martens | July 15, 1947 |
| 2,453,512 | Jacobi | Nov. 9, 1948 |